US009394830B2

(12) United States Patent
McCormick

(10) Patent No.: US 9,394,830 B2
(45) Date of Patent: Jul. 19, 2016

(54) INVERTED CAP IGNITER TUBE

(71) Applicant: Rolls-Royce Corporation, Indianapolis, IN (US)

(72) Inventor: Kelly J. McCormick, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 293 days.

(21) Appl. No.: 14/134,024

(22) Filed: Dec. 19, 2013

(65) Prior Publication Data
US 2014/0352275 A1 Dec. 4, 2014

Related U.S. Application Data

(60) Provisional application No. 61/786,092, filed on Mar. 14, 2013.

(51) Int. Cl.
*F02C 7/264* (2006.01)
*F23R 3/00* (2006.01)
*F23R 3/60* (2006.01)

(52) U.S. Cl.
CPC .............. *F02C 7/264* (2013.01); *F23R 3/002* (2013.01); *F23R 3/60* (2013.01); *F23D 2207/00* (2013.01)

(58) Field of Classification Search
CPC ............ F02C 7/264; F02C 7/266; F23R 3/60; F23D 2207/00
USPC .................... 60/39.281, 776, 39.821, 39.826, 60/39.827; 431/350, 351
See application file for complete search history.

(56) References Cited

U.S. PATENT DOCUMENTS

| 2,693,082 | A |  | 11/1954 | Arthur |
|---|---|---|---|---|
| 3,048,015 | A | * | 8/1962 | Barrelle ............... F02C 7/266 60/39.821 |
| 4,216,651 | A |  | 8/1980 | Ormerod |
| 5,442,907 | A |  | 8/1995 | Asquith et al. |
| 6,314,739 | B1 |  | 11/2001 | Howell et al. |
| 6,557,350 | B2 |  | 5/2003 | Farmer et al. |
| 6,715,279 | B2 |  | 4/2004 | White |
| 7,101,173 | B2 |  | 9/2006 | Hernandez et al. |
| 7,216,488 | B2 |  | 5/2007 | Howell et al. |
| 7,546,739 | B2 |  | 6/2009 | Holland et al. |
| 7,640,752 | B2 |  | 1/2010 | Gautier et al. |
| 7,946,119 | B2 |  | 5/2011 | Geary |
| 8,099,963 | B2 |  | 1/2012 | Pieussergues et al. |
| 8,181,440 | B2 |  | 5/2012 | Sandelis |

(Continued)

FOREIGN PATENT DOCUMENTS

EP    1741982 A2    1/2007

OTHER PUBLICATIONS

International Search Report PCT/US2013/067762 mailed on Jul. 25, 2014.

*Primary Examiner* — Steven Sutherland
(74) *Attorney, Agent, or Firm* — Fishman Stewart PLLC

(57) ABSTRACT

An igniter tube assembly includes an igniter, an igniter tower with a radially extending portion, a ferrule with a radially extending portion, and a retainer with a radially extending portion. The ferrule and retainer capture the radially extending portion of the igniter tower and sealing surface provides an area for the ferrule to interface with the igniter tower. The igniter moves relative to the casing in which it is secured while a fluid seal between the igniter and ferrule controls air flow.

21 Claims, 2 Drawing Sheets

(56) References Cited

U.S. PATENT DOCUMENTS

| | | |
|---|---|---|
| 8,261,556 B2 | 9/2012 | Audin et al. |
| 2009/0064657 A1 | 3/2009 | Zupanc et al. |
| 2009/0151361 A1* | 6/2009 | Audin ............... F23R 3/002 60/796 |
| 2009/0178385 A1 | 7/2009 | Sandelis |
| 2010/0212324 A1 | 8/2010 | Bronson et al. |
| 2011/0113747 A1 | 5/2011 | Lains et al. |
| 2011/0113748 A1 | 5/2011 | Lains et al. |
| 2011/0120132 A1 | 5/2011 | Rudrapatna et al. |

* cited by examiner

INVERTED CAP IGNITER TUBE

CROSS-REFERENCE TO RELATED APPLICATIONS

This application claims priority to U.S. Provisional Patent Application No. 61/786,092 filed Mar. 14, 2013, the contents of which are hereby incorporated in their entirety.

FIELD OF TECHNOLOGY

Combustor igniters for a gas turbine engine, and more particularly, a combustor igniter tube with a combined ferrule and cap.

BACKGROUND

Gas turbine engines are used extensively in high performance aircraft and they employ compressors, combustors and turbines and during operation they generate energies and air flows that impact the performance of the engine's systems. Often those energies and air flows impart forces upon various components of the engine and if properly channeled greater efficiencies and economical performance can be achieved which is desired in the competitive airline industry. However, some of those energies may induce premature or undesirable wear on the engine's components which in turn can negatively impact operating performance and efficiencies of the engine.

Combustors are employed in gas turbine engines to ignite fuel and air mixtures. Typical combustors may use inner and outer liners that define an annular combustion chamber in which the fuel and air mixtures are combusted. The inner and outer liners are spaced radially inwardly from the combustor casing such that inner and outer passage ways are defined between the respective inner and outer liners and the combustor casing. One or more fuel igniters may extend through the combustor casing and the outer passageways, and are coupled to the outer liner by igniter tubes that are attached to the combustor liner. The fuel igniter tubes serve to secure and maintain the igniters in alignment relative to the combustor chamber as well as provide a sealing interface for the igniter between the outer passageway and the combustion chamber.

Combustor assemblies are subjected to extreme forces during ignition and during normal operation. Certain combustor components of the igniters, such as the igniter ferrule and cap, are subjected to significant wear during operation of the engine. Such conditions include engine vibrations which in turn results in a relative sliding motion between the igniter tube and the ferrule, resulting in wear between the captive ferrule and a tube plateau. Such action consequently may prematurely reduce the life of the igniter tube. This is in part due to the relatively small surface area of contact between the ferrule and the igniter tube which during operation can result in excessive wear rates of the igniter tube. Such a condition remains an engineering challenge in the aircraft industry.

An exemplary embodiment for an improved igniter assembly is provided that is used in connection with a gas turbine engine. Enhanced wear characteristics and increased wear life of the igniter tube assembly is achieved while maintaining the envelope in which the igniter assembly resides. An exemplary method of assembling an igniter tube assembly for an engine is further provided.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Combustor igniter tubes may experience significant wear at the contact surface between a radially extending plateau portion of the igniter tube and a ferrule as vibration during engine operation results in a relative sliding motion between the ferrule and the tube plateau. Even normal engine vibration and consequent wear may reduce the life of the combustor igniter tubes. An exemplary igniter tube assembly is provided which overcomes the aforementioned problems.

The exemplary igniter tube assembly includes an arrangement of disposing the plateau portion of the igniter tube assembly between the ferrule and a retainer. Such an arrangement provides for increased wear life over current designs within the same design envelope. The diameter of the ferrule is significantly increased, and the retaining features of the ferrule are inverted. Such a design construct increases the diameter and area of the contact surface between the ferrule and the radially extending plateau portion of the tube, resulting in reduced friction at the contact surface between the ferrule and the radially extending portion of the igniter tower without increasing the thickness of the plateau portion of the igniter tower.

The exemplary embodiment also provides for an assembly with an increased wear life due to an increased abradable material volume resulting from increased contact surface diameter. The thickness of the plateau portion of the igniter tube may be retained, and reduced friction at the contact surface may result due to an increase in contact surface area without increasing the surface area exposed to a pressure differential or significantly reducing the clearance between the igniter tube and the nearby walls of the outer combustor case. The improved igniter tube design allows for an increase in wear thickness without increasing the overall height of the igniter tube which, in turn, may result in increased wear life.

Figure 1:
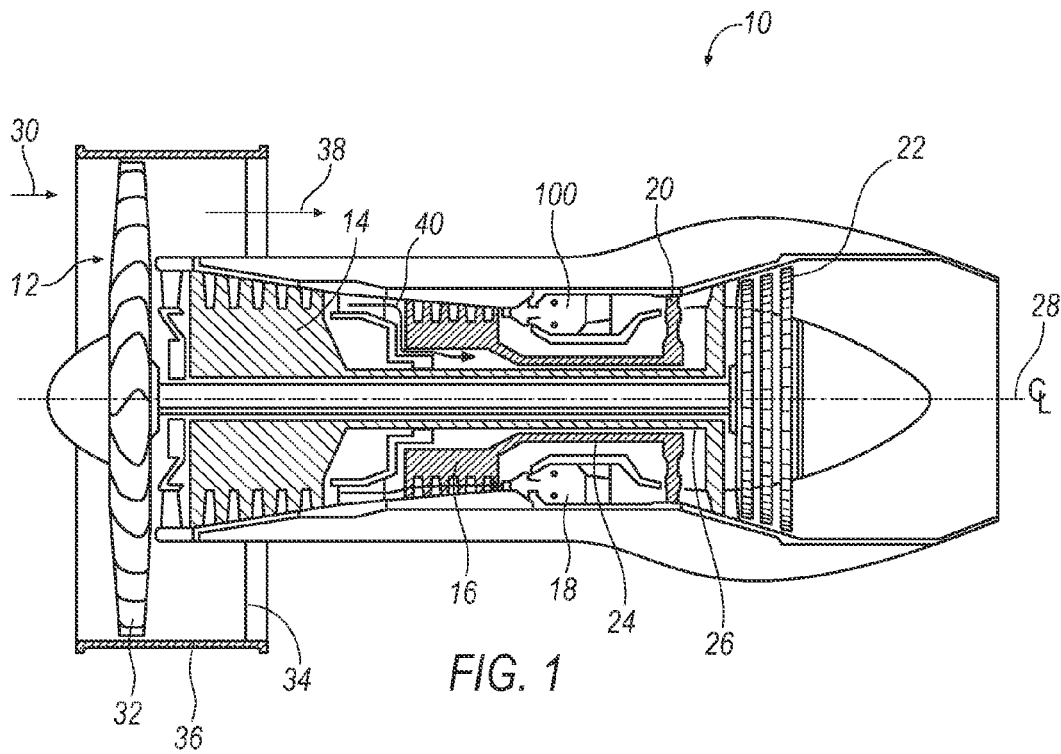
FIG. 1 illustrates a schematic diagram of a gas turbine engine employing an improved combustor igniter assembly.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved combustor 18 having an igniter tube assembly 100, the details of the exemplary design are set forth herein.

Figure 2:
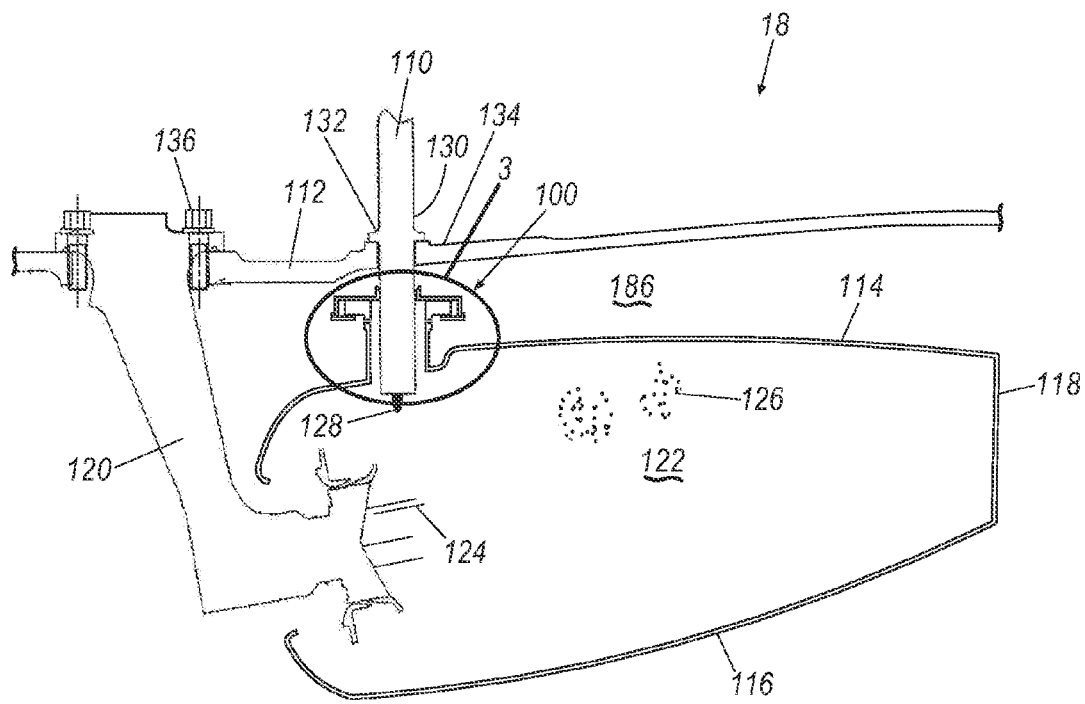
FIG. 2 illustrates an enlarged side sectional view of a combustor, showing a combustor igniter tube assembly.

FIG. 2 illustrates a side sectional view of a combustor 18 having an improved igniter tube assembly 100 for use in connection with a gas turbine engine 10. The general components of the combustor 18 includes the igniter tube assembly 100, an igniter tube 110, a combustor casing 112, an outer liner 114 and inner liner 116 that partially define a shell 118, and a fuel nozzle 120. A combustion chamber 122 receives pressurized fuel 124 that mixes with heated recirculating air particles 126. The igniter 110 provides ignition 128 during an initial cold startup up or during a restart event that may occur during operation of the gas turbine 10.

The igniter tube 110 may include an outer perimeter surface 130 with an associated mounting flange 132. The flange 132 in turn may be mounted via conventional methodologies to a raised surface 134 of the combustor casing 112. The igniter tube 110 moves relative to the assembly 100 during engine 10 operation. The combustor shell 118 is separately mounted with respect to the casing 112, and thus during engine operation they tend to oscillate and flex as the torsional forces of the engine 10 are thrust upon that components of the engine.

The fuel nozzle 120 is affixed to the casing 112 by fasteners 136 which results in the fuel nozzle 120 moving relative to the combustor shell 118. It will be appreciated that the igniter tube 110 and fuel nozzle 120 may be secured to the combustor case 112 by other means and as such they are not limited to the examples proposed herein. The improved igniter tube assembly 100 interacts with the frictional elements that occur between the igniter tube 110 and the tube tower 138 construct the interfaces with the combustor shell 118.

Figure 3:
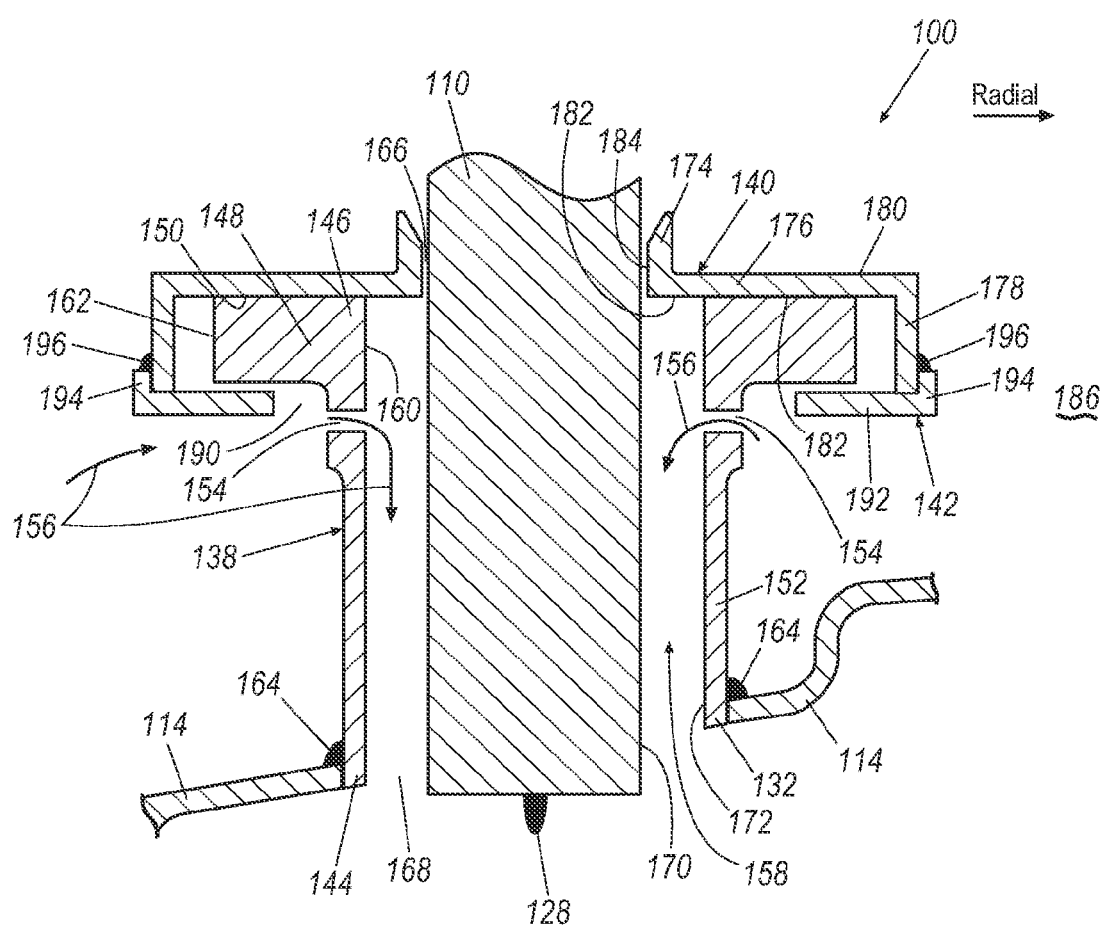
FIG. 3 illustrates an enlarged side sectional view taken from circle 3 of FIG. 2, showing an improved combustor igniter tube assembly.

An exemplary igniter tube assembly 100 is illustrated in FIG. 3. The igniter tube assembly includes an igniter tower 138, a ferrule 140, and a retainer 142. The igniter tower 138 includes a first end 144 and a second end 146. The second end 146 of igniter tower 138 includes a radially extending plateau portion 148 having a plateau surface 150. The igniter tower 138 includes a tubular-shaped wall 152 near the first end 144 and the wall 152 includes a plurality of fluid passage-way holes 154 that extend therethrough. The holes 154 may be positioned at various locations and they provide an inlet for cooled air 156 to enter a tower chamber 158. The cooled air 156 aids to cool the igniter tube 110 during operation of the engine 10. Thus, the improved igniter assembly 100 provides an improved cooling system in conjunction with an improved mounting arrangement between the igniter tube 110 and the combustor liner 114.

The tower 138 includes a radially extending plateau portion 148 near the upper end 146 that extends radially from a wall 160. The radially extending plateau portion 148 extends substantially radially outwardly from the wall 160 and has an outer surface 162 defining an outermost wall of the plateau portion 148. The lower end 144 of the tower 138, may be secured to wall 114 of the shell 118 with a weld 164. The weld 164 securing igniter tower 138 to liner 114 may extend around the entire circumference of igniter tower 138, or the weld may be spaced apart and thus an intermittent weld. The tower 138 may be constructed of materials that are typically employed in combustor tower applications.

Igniter 110 extends through the outer combustor case 112, through opening 166 defined by ferrule 140, through igniter tower 138 in the tower chamber 158, and into combustor shell 118, thereby allowing combustion gases to come into contact with a flame 128 where ignition occurs. A clearance 168 resides between the outer diameter 170 of the igniter tube 110 and the inside surface 172 of the tower 138. The clearance 168 provides a space for cooled air 156 to traverse within tower chamber 158. The clearance 168 also provides a void for the tube 110 to oscillate in free of engagement of the igniter tower 138.

Ferrule 140 defines the generally circular opening 166 through which igniter 110 extends. Ferrule 140 includes a first longitudinal portion 174 that extends longitudinally along igniter 110, and a radially extending annular portion 176 that extends radially in a generally orthogonal direction from one end of first longitudinal portion 174. The first longitudinal portion 174 of ferrule 140 may extend from the inner radius of ferrule 140 along igniter 110. Ferrule 140 further includes a second longitudinal portion 178 extending from the outer radius of radially extending annular portion 176. Second longitudinal portion 178 may extend in a generally orthogonal direction from radially extending portion 176 and generally parallel with and coaxial to first longitudinal portion 174. Second longitudinal portion 178 may extend generally toward retainer 142. Radially extending portion 176 of ferrule 140 has a first face 180 and a second face 182. First longitudinal portion 174 may extend from first face 180, and second longitudinal portion 178 may extend from second face 182 of ferrule 140.

The ferrule 176 provides a seal 184 about the perimeter of igniter 110. The seal 184 minimizes air flow between the region 186 that resides outside the combustor and the chamber 122 that is located within the combustor shell 118, while allowing for relative movement caused by vibration and differing thermal growth between igniter 110 and combustor shell 118. While the relative movement of igniter 110 and combustor shell 118 is accommodated by sealing ferrule 140, wear occurs at the surface 182 which is disposed between ferrule 140 and plateau surface 150. The large area of contact between ferrule 140 and plateau surface 150 aids to reduce the amount of wear that occurs at plateau surface 150.

Retainer 142 defines a generally circular opening 190. Retainer 142 includes a radially extending annular portion 192 that extends in a direction that is generally radial from igniter 110. Retainer 142 further includes a longitudinal portion 194 that extends in a generally orthogonal direction from radially extending portion 192. Longitudinal portion 194 of retainer 142 may extend from the outer radius of radially extending portion 192 of retainer 142 and generally toward ferrule 140.

Ferrule 140 and retainer 142 are secured to one another, thereby retaining radially extending plateau portion 148 of igniter tower 138 between ferrule 140 and retainer 142. Second longitudinal portion 178 of ferrule 140 may be secured to longitudinal portion 194 of retainer 142. Ferrule 140 and retainer 142 may be secured to one another by welds 196, or other conventional means, such that ferrule 140 and retainer 142 are not separable from one another and they form a unitary inverted cap that retains the tower 138. Welds 196 may be intermittent or may extend around the full circumference of ferrule 140 and retainer 142.

The material selected for ferrule 140 may be a high temperature resistant material that is more resistant to wear than the material chosen for igniter tower 138, thereby biasing wear to igniter tower 138 rather than to ferrule 140. Disposing radially extending plateau portion 148 of igniter tower 138 between ferrule 140 and retainer 142 allows for relative movement between igniter 110 and combustor wall 114 resulting from vibration and thermal expansion and contraction, while minimizing air flow between igniter 110 and igniter tower 132.

Growth rates of wall 114 of combustor shell 118 and outer combustor case 112 differ at varying points throughout the normal operation of the turbine engine 10. Disposing radially extending plateau portion 148 of igniter tower 138 between retainer 142 and ferrule 140 allows increased wear life while maintaining sufficient clearance between combustor igniter tube 110 and the combustor liner 114.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. An igniter tube assembly comprising:
an igniter;
an igniter tower with a radially extending portion;
a ferrule with a radially extending portion; and
a retainer with a radially extending portion,
wherein the radially extending portion of the igniter tower is disposed between the radially extending portion of the retainer and the radially extending portion of the ferrule; and
wherein the igniter tower is formed of a first material and the ferrule is formed of a second material, and wherein the first material is a different material from the second material.

2. The igniter tube assembly as claimed in claim 1, wherein the ferrule is secured to the retainer, the ferrule and retainer collectively retain the radially extending portion of the igniter tower.

3. The igniter tube assembly as claimed in claim 1, wherein the ferrule is secured to the retainer by a weld.

4. The igniter tube assembly as claimed in claim 1, wherein the igniter tower includes apertures for providing cooling air to the igniter.

5. The igniter tube assembly as claimed in claim 1, further comprising a combustor wall, the igniter tower is secured to the combustor wall.

6. The igniter tube assembly as claimed in claim 1, wherein the ferrule has a z-shaped configuration.

7. The igniter tube assembly as claimed in claim 1, wherein the ferrule provides a seal about the igniter, thereby minimizing air flow between the ferrule and the igniter tower, while allowing relative movement between the igniter and a combustor wall.

8. The igniter tube assembly as claimed in claim 1, wherein the second material is more resistant to friction-induced wear than the first material.

9. The igniter tube assembly as claimed in claim 1, wherein the radially extending portion of the ferrule has an inner radius and an outer radius, each radius has a portion extending therefrom that includes a first longitudinal portion extending from the inner radius.

10. The igniter tube assembly as claimed in claim 9, wherein the ferrule has a second longitudinal portion, and wherein the second longitudinal portion extends from the outer radius of the ferrule.

11. The igniter tube assembly as claimed in claim 10, wherein the ferrule has a first face and a second face, and wherein the first longitudinal portion extends from the first face and the second longitudinal portion extends from the second face of the ferrule.

12. The igniter tube assembly as claimed in claim 1, wherein the radial extending portion of the retainer has an inner radius and an outer radius, an annular portion extends from the outer radius of the retainer.

13. The igniter tube assembly as claimed in claim 1, further comprising a seal positioned between the ferrule and the igniter.

14. An igniter tube assembly comprising:
an igniter tower with a radially extending portion;
a ferrule with a radially extending portion; and
a retainer with a radially extending portion;
wherein the radially extending portion of the igniter tower is disposed between the radially extending portion of the retainer and the radially extending portion of the ferrule; and
wherein the igniter tower is formed of a first material and the ferrule is formed of a second material, and wherein the first material is a different material from the second material.

15. The igniter tube assembly as claimed in claim 14, wherein the ferrule is secured to the retainer and retains the radially extending portion of the igniter tower between the radially extending portion of the ferrule and the radially extending portion of the retainer.

16. The igniter tube assembly as claimed in claim 14, further comprising an igniter.

17. The igniter tube assembly as claimed in claim 14, further comprising a combustor shell, the igniter tower is secured to the combustor shell.

18. The igniter tube assembly as claimed in claim 14, further comprising a combustor casing.

19. The igniter tube assembly as claimed in claim 14, wherein the second material is more resistant to friction-induced wear than the first material.

20. A gas turbine engine having an igniter tube assembly, the igniter tube assembly comprising:
an igniter;
an igniter tower with an extended portion;
a ferrule with an extended portion; and
a retainer positioned below the ferrule, the retainer having an extended portion;
wherein the extended portion of the igniter tower is located between the extended portion of the retainer and the extended portion of the ferrule; and
wherein the igniter tower is formed of a first material and the ferrule is formed of a second material, and wherein the first material is a different material from the second material.

21. The gas turbine engine as claimed in claim 20, wherein the second material is more resistant to friction-induced wear than the first material.

* * * * *